(12) United States Patent
Bartelme et al.

(10) Patent No.: US 6,445,930 B1
(45) Date of Patent: Sep. 3, 2002

(54) POWER CONTROL SYSTEM AND METHOD FOR USE WITH WIRELESS COMMUNICATIONS SYSTEM

(76) Inventors: Joseph Peter Bartelme, 2111 Lakeridge Dr., Grapevine, TX (US) 76501; Robert Joseph McCarty, Jr., 7125 Holden Dr., Rockwall, TX (US) 75087

( * ) Notice: Subject to any disclaimer, the term of this patent is extended or adjusted under 35 U.S.C. 154(b) by 0 days.

(21) Appl. No.: 09/296,055

(22) Filed: Apr. 21, 1999

(51) Int. Cl.$^7$ .............................. H04Q 7/20; H04B 17/00
(52) U.S. Cl. ..................... 455/522; 455/67.1; 455/69
(58) Field of Search .................... 455/69, 67.1, 13.4, 455/522, 517, 127, 200

(56) References Cited

U.S. PATENT DOCUMENTS

| | | | |
|---|---|---|---|
| 5,267,262 A | 11/1993 | Wheatley, III | |
| 5,299,199 A | 3/1994 | Wilson et al. | |
| 5,465,399 A | * 11/1995 | Oberholtzer et al. | 455/69 |
| 5,509,002 A | 4/1996 | Baden et al. | 370/18 |
| 5,564,074 A | 10/1996 | Juntti | |
| 5,564,075 A | 10/1996 | Gourgue | 455/69 |
| 5,590,409 A | 12/1996 | Sawahashi et al. | 455/69 |
| 5,603,096 A | 2/1997 | Gilhousen et al. | 455/69 |
| 5,627,857 A | 5/1997 | Wilson | 375/219 |
| 5,631,921 A | * 5/1997 | Schilling | 375/130 |
| 5,655,220 A | 8/1997 | Weiland et al. | 455/69 |
| 5,689,815 A | 11/1997 | Yamazaki et al. | 455/69 |
| 5,710,981 A | * 1/1998 | Kim et al. | 455/69 |
| 5,787,079 A | 7/1998 | Bateman et al. | 370/343 |
| 5,790,533 A | 8/1998 | Burke et al. | 370/318 |
| 5,799,010 A | 8/1998 | Lomp et al. | 370/335 |
| 5,812,938 A | 9/1998 | Gilhousen et al. | 455/69 |
| 5,815,798 A | * 9/1998 | Bhagalia et al. | 455/13.4 |
| 6,226,281 B1 | * 5/2001 | Cordier et al. | 370/335 |
| 6,311,070 B1 | * 10/2001 | Tong et al. | 455/522 |

FOREIGN PATENT DOCUMENTS

| | | | |
|---|---|---|---|
| AU | A-59681/98 | 3/1998 | H04Q/7/30 |
| EP | 0615353 | 9/1994 | H04B/7/005 |
| EP | 0869626 | 10/1998 | H04B/7/005 |
| WO | WO 98/45962 | 10/1998 | H04B/7/005 |

OTHER PUBLICATIONS

Samir Soliman et al: "CDMA Reverse Link Open Loop Power Control" Proceedings of the Global Telecommunications Conference (Globecom), U. S. New York, IEEE, pp. 69–73, Dec. 6, 1992.

* cited by examiner

*Primary Examiner*—Edward F. Urban
*Assistant Examiner*—Erika A Gary
(74) *Attorney, Agent, or Firm*—Slater & Matsil, LLP

(57) ABSTRACT

In method of communicating from a terminal unit to a base unit, an incoming signal is sent from the base unit and received at the terminal unit. The terminal unit will measure the level of this incoming signal. The terminal unit may also extract digital information from the incoming signal. Based on either the measured signal level, the extracted information or both, the terminal will calculate an output power level to use in transmitting a signal back to the base unit. An outgoing signal can then be transmitted from the terminal unit using the output power level.

2 Claims, 2 Drawing Sheets

POWER CONTROL SYSTEM AND METHOD FOR USE WITH WIRELESS COMMUNICATIONS SYSTEM

CROSS-REFERENCE TO RELATED APPLICATIONS

The following U.S. patents and/or commonly assigned patent applications are hereby incorporated herein by reference:

| Patent or Ser. No. | Filing Date | Issue Date | Attorney Docket No. |
|---|---|---|---|
| 5,787,079 | 4/23/96 | 7/28/98 | |
| 6,252,910 | 4/21/99 | 6/26/01 | COM-002 |

FIELD OF THE INVENTION

The present invention relates generally to power control systems and more particularly to power control systems and methods for use with wireless communications system.

BACKGROUND OF THE INVENTION

Wireless communications are becoming more popular as technology develops. Many people are now communicating through cellular telephones, pagers, radio frequency devices and others. As this trend continues, there is an ongoing need to optimize the communication channel between the two remote communications units.

One issue that arises is the power level that a mobile unit should use to transmit to the base station. In general, the base station has a desired signal level or range of signal levels for incoming communications. This level is determined by, among other things, the output power used by the mobile unit. Therefore, the mobile unit must be able to transmit at a power level compatible with the base station. This level will vary as the mobile unit moves closer to and farther from the base station.

In a well known method, the mobile unit will transmit a first message to the base station at a very low signal level. It will then keep raising the level until a response is received from the base station. The reason the mobile unit generally starts at a low level is because if the power level gets too high, the system will lose capacity. After the terminal begins communicating with the base station, the base station may tell the terminal to increase or decrease its power output. With CDMA (code division multiple access), for example, a continuous update signal is provided every millisecond so that the terminal adjusts its output power once a millisecond.

SUMMARY OF THE INVENTION

The preferred embodiment of the present invention discloses a power control method that utilizes both open loop control and closed loop control. An advantageous feature of the preferred embodiment is the ability to automatically control the output gain of the terminal units based upon the strength of the signal received at the base unit. This control can also, or alternatively, be based on the system gain of the base unit and/or a power level increment/decrement signal provided by the base unit.

In one aspect, the present invention describes a method of communicating from a terminal unit to a base unit. An incoming signal is sent from the base unit and received at the terminal unit. The terminal unit will measure the level of this incoming signal. The terminal unit may also extract digital information from the incoming signal. Based on either the measured signal level, the extracted information or both, the terminal will calculate an output power level to use in transmitting a signal back to the base unit. An outgoing signal can then be transmitted from the terminal unit using the output power level.

In another aspect, the present invention provides a method of communicating from a base unit to a terminal unit. In this method, which can be used in conjunction with the method described in the previous paragraph, the base unit transmits a system gain message to the terminal unit. This base unit system gain message includes information regarding the base power output level and/or the desired level of signal to be received from that terminal. At a later time, the base unit will receive a signal from the terminal unit and determine the signal level of that signal. Based on that signal level, the base unit will determined a power level increment factor and communicate that factor back to the terminal. The terminal can then use the power level increment factor to adjust its output power for future communications.

The power control techniques of the present invention are particularly useful in systems where the base unit is communicating with multiple terminal units over an FDM (frequency division multiplexed) spectrum, especially a system using sub-bands. In this application, it is important that out-of-band transmissions from one channel or sub-channel do not interfere with the base units ability to receive transmissions from sources utilizing adjacent channels or subchannels. To accomplish this goal, it is useful if transmissions from each source are received at about the same signal level. The present invention provides a technique that helps to achieve this objective.

The output gain control functions also provide the advantage of increasing the battery life of the terminal units, as the base unit will continuously monitor the received signal and will instruct the terminal unit to only provide as much output gain as is necessary for signal clarity. In this way, the power consumed by the output circuitry of the terminal unit is minimized.

BRIEF DESCRIPTION OF THE DRAWINGS

The above features of the present invention will be more clearly understood from consideration of the following descriptions in connection with accompanying drawings in which.

DETAILED DESCRIPTION

The making and use of the presently preferred embodiments are discussed below in detail. However, it should be appreciated that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to a specific embodiment, namely a trunked radio system. The invention also applies, however, to other types of communications systems such as cellular telephones (digital and analog), microwave communications, satellite communications, and others.

Figure 1:
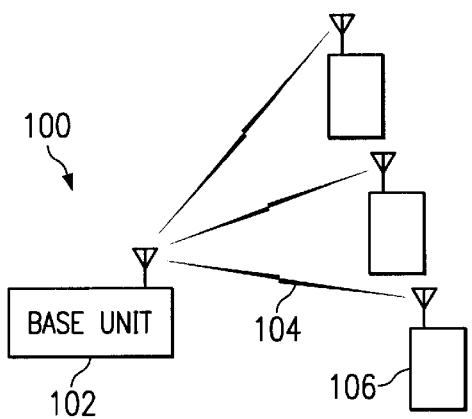
FIG. 1 is block diagram of a communication system of the present invention.

FIG. 1 illustrates an exemplary radio system 100. System 100 could be a cellular telephone system, a two-way radio dispatch system, a localized wireless telephone or radio system or the like. Base unit 102 can communicate over transmission medium 104 to one or more terminal units 106. Transmission medium 104 represents the wireless communication spectrum. Terminal units 106 can be mobile units, portable units, or fixed location units and can be one way or two way devices. Although only one base unit is illustrated the radio system 100 may have two or more base units, as well as interconnections to other communication systems, such as the public switched telephone network, an internet, and the like. In the preferred embodiment, the system provides for full duplex communications. The teachings of the present invention, however, apply equally to half duplex systems, as well as to time division duplex and other two-way radio systems.

Further details of a radio system as illustrated in FIG. 1 can be found in co-pending application Ser. No. 09/295,660 filed Apr. 21, 1999 and now U.S. Pat. No. 6,252,910, issued Jun. 26, 2001 (COM-002), which is incorporated herein by reference as if reproduced in its entirety. The present invention could also be used with a system as described in U.S. Pat. No. 5,787,079, incorporated herein by reference.

As is well known, radio frequency communications must be transmitted at certain defined frequencies, or more accurately, must be transmitted within defined bandwidths, or channels, centered about defined frequencies. These channels are defined by the appropriate governing authority and are allocated for various spectrum users. In the United States, the Federal Communications Commission (FCC) administers and allocates spectrum usage for non-government users. The NTIA performs a similar function for federal government usage. Other countries have similar organizations.

Radio frequency channels for two-way radio communications are typically defined at 30 kHz, 25 kHz, or in some cases 12.5 kHz wide. Channels of 6.25 kHz and 5.0 kHz are also in use and it is anticipated that other bandwidth channels may be defined in the future. Out of channel transmissions must be carefully limited in order to prevent transmissions on one channel from interfering with communications on adjacent channels. Channels can be assigned as receive-transmit pairs or as a single frequency.

Figure 2:
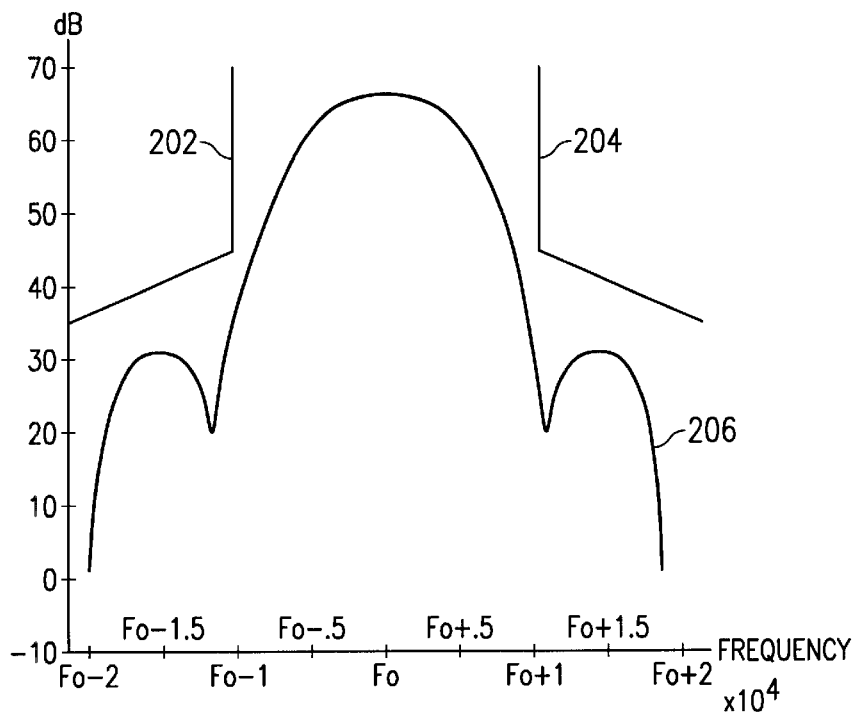
FIG. 2 is a frequency domain representation of a first communication channel that can utilize the teachings of the present invention.

FIG. 2 illustrates an emissions mask for a system using a 25 kHz channel. This system can utilize the power control methods of the present invention. The channel is centered about a channel frequency $f_0$ and extends plus or minus 12.5 kHz on either direction of the center frequency. Note that under FCC regulations, emissions drop off rapidly at the edges of the channel and must be −25 dB at the frequency limits of the occupied channel (i.e. at plus or minus 10 kHz). A typical emissions mask is illustrated by the curves labeled 202, 204 of FIG. 2. Note that the entire available channel, less reserved portions for guard-bands, is occupied by a single, roughly 20 kHz wide signal, representing a single communication path between a base unit and a terminal unit.

In the preferred embodiment, the system is a time domain multiplexed (TDM) system. At any given time (e.g., a first TDM time slot), a first terminal unit has access to the channel and only it may transmit to the base unit (on that channel). No other transmission can occur at these frequencies at this time. The transmissions from the first terminal unit are illustrated (in the frequency domain) by the curve 206.

For a TDM system, a second terminal unit has access to the channel during a second time slot and only it may transmit to the base unit (on that channel) at that time. During this second time period, the first terminal unit may not transmit. In this way, contention between the first and second terminal units is prevented. Note that during the second time period although the first terminal unit may not transmit, it may receive transmission from the base unit being transmitted over the forward channel (on a different frequency channel). Likewise, the second terminal unit may receive transmissions from the base unit during the first time period, although it may not transmit during this time.

For a typical 25 kHz channel, up to a maximum of 20 kHz is available for signal transmission (the remaining 5 kHz being reserved for guard-banding.) Currently the maximum practical data rate for a 20 kHz channel is 64 kbits/sec (using a 16 QAM system). Assuming the normal data rate of the signal to be transmitted (as a function of the vocoder, the forward error correction, and miscellaneous control overhead bits) is 8 kb/s, the maximum number of time slots that could be transmitted over the channel would be eight. This is because the signal would need to be transmitted at eight times the normal rate (i.e. at 64 kb/s) during the one eighth of the time allocated to each communication path. In many systems, at least one time slot is reserved for control signals, which would further limit the number of time slots available for voice signal transmission. As technology advances, improved vocoders and other system components may make possible acceptable signal quality at lower data rates. An advantage of the preferred embodiments is the ability to adjust the number of time slots, length of time slots, and the like, as the capabilities of system components advance.

Figure 3:
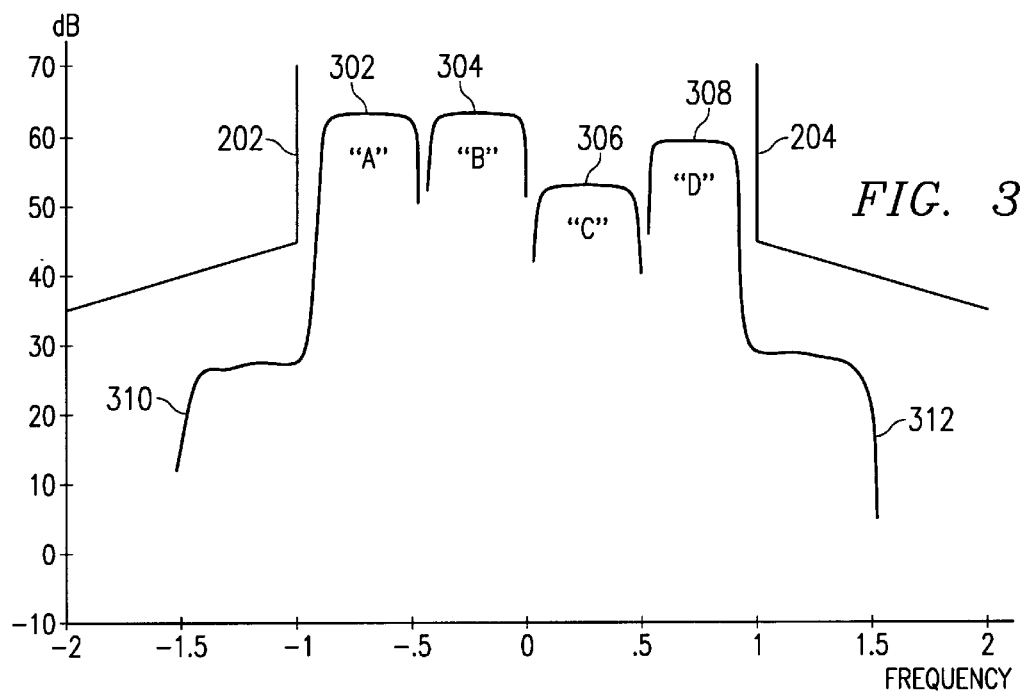
FIG. 3 is a frequency domain representation of a second communication channel can utilize the teachings of the present invention.

FIG. 3 illustrates an emissions mask for a 25 kHz channel that has been divided into separate sub-channels. In the preferred embodiment, the FCC defined 25 kHz channel is divided into four sub-channels of 4 kHz each. The sub-channels are separated from each other by 800 Hz guard-bands, and the channel has guard-bands on the sides as well to prevent inter-channel interference.

In the preferred embodiment the center of sub-channel A is offset from the center frequency of the channel by −7.2 kHz, i.e. the sub-channel is 4 kHz wide and is centered about a frequency offset from the channel frequency $f_0$ by −7.2 kHz. The center of sub-channel B is offset from the center frequency by −2.4 kHz, the center of sub-channel C is offset by 2.4 kHz and the center of sub-channel D by 7.2 kHz, as shown.

Sub-channels A, B, C, and D are illustrated by frequency domain curves 302, 304, 306, and 308, respectively in FIG. 3. Note that out-of-band emissions are also illustrated in FIG. 3, as curves 310 and 312. These curves represent noise as well as side-band signals associated with the four sub-channels A–D. Such noise and side-band signals also occur within the four sub-channels A–D, but will not interfere with the desired signal, provided the signal to noise ratio is adequate.

Each sub-channel corresponds to an available communication path between the base unit 102 and a terminal unit 106. More accurately, in the preferred embodiment, because of time division multiplexing, each sub-channel is time divided into two time slots for voice or data traffic, hence each sub-channel represents two communication paths. In this way, up to eight separate communication paths can be established on a standard 25 kHz channel. In fact, as shown, the four sub-channels and sufficient guard-banding only occupy about a 20 kHz bandwidth. Note that, even without TDM, up to four communications paths can be established on a single 25 kHz channel. As will be apparent to one skilled in the art, the teachings of the preferred embodiments can be applied to other organizations, such as additional time slots and/or narrower (or wider) sub-channels as permitted by the desired data rates and capacity needs.

Note that the signal being carried on sub-channel C is shown as being weaker (lower magnitude) than the signal on adjacent sub-channels B and D. This may be because the terminal unit transmitting on sub-channel C is further away from the receiving base unit than the terminal units transmitting on the adjacent sub-channels. In order to prevent a sub-channel's signal from being swamped out by the sideband signals of the adjacent sub-channels, guard-bands are employed. In the preferred embodiments, the sub-channels are separated by 800 Hz guard-bands.

Additionally, as will be discussed in greater detail below, the system 100 employs a transmission gain feedback loop between the base unit and the terminal units. When the base unit detects that a terminal unit's signal is weak relative to the signals received on the other sub-channels, the base unit will instruct the terminal unit to increase its transmission gain, as will be discussed in more detail below. The value used to instruct the terminal to increase its gain is sent during one time slot and implemented in the next time slot. Accordingly, the output power of the terminal can be adjusted once in a time slot, e.g., every 60 ms.

One advantageous feature of the preferred embodiment is the ability to automatically control the output gain of the terminal units 106 based upon the strength of the signal received at the base unit 102. As discussed above, it is necessary to keep the signal level of the signals received on the sub-channels approximately equal (or as near to equal as possible) to minimize the interference between sub-channels.

Returning to FIG. 3, this drawing presents an idealized signal where the entire energy of a given signal is contained within its 4 kHz bandwidth. In reality, considerable energy is also transmitted outside the 4 kHz bandwidth. Even with guard-bands, some energy from one sub-channel will be transmitted in the bandwidth of the adjacent sub-channel. This out-of-band energy is typically highly attenuated with respect to the in-band energy, typically on the order of minus 20 dB relative to the in-band energy. If the signal being received on sub-channel A is as strong as the signal being received on sub-channel B, for instance, then the interference caused by out-of-band transmissions from sub-channel B, being 20 dB down, would not cause significant interference with signal reception on sub-channel A.

Note in FIG. 3, however, that the signal being received on sub-channel C is considerably weaker than the signal being received on sub-channel D (and sub-channel B as well). The weak signal on sub-channel C is much more susceptible to the interference caused by the out-of-band transmissions from sub-channels B and D. To compensate for this a gain control feedback loop is established between the base unit and the terminal units.

The present invention describes both open loop and closed loop control measures, either of which can be used to control the power output from the terminal unit 106. In fact, in the preferred embodiment both open loop and control loop power control are utilized to regulate the power outputs of the various terminals transmitting on a given channel. Open loop control will be described first.

In open loop power control, the terminal unit 106 measures the level of the signal received from the base station 102 and adjusts its power output dependent on this received signal level.

As discussed above, the goal of power control is to keep all of the sub-channels at the same amplitude. This task is made more difficult by the fact that each of the four sub-channels A, B, C and D (see FIG. 3) are transmitted from four different terminal units 106 at any given time. To complicate matters, none of the terminal units 106 have any information regarding the other units, which may be closer or further from the base unit 102. Despite these difficulties, it is desirable that signals on each channel be received at the base unit 102 at the same predetermined level.

Figures 4A, 4B:
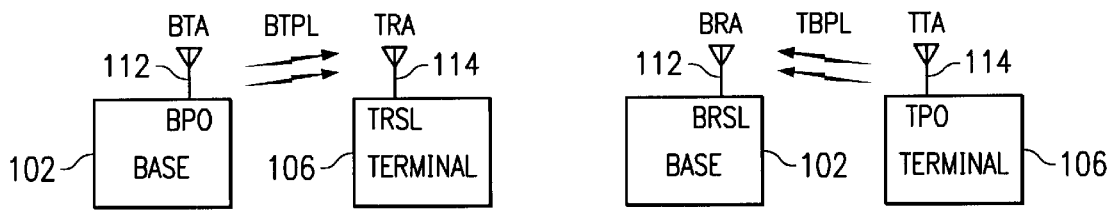
FIGS. 4a and 4b illustrate the gains and losses of a signal propagating in a communications system.

FIGS. 4a and 4b illustrate a simplified version of a radio communication system. These diagrams are used to illustrate the variations in signal strength as a signal propagates from the base unit 102 to the terminal 106 (FIG. 4a) and from the terminal 106 back to the base unit 102 (FIG. 4b). The factors that affect signal level are summarized in Table 1 and will be used to set the initial output signal level for the terminal unit 106.

TABLE 1

| Item | Abbreviation | Where from |
|---|---|---|
| Base Power Output (one subchannel) | BPO | Known |
| Base Transmit Antenna System Gain | BTA | Known |
| Base to Terminal Path Loss | BTPL | Unknown |
| Terminal Receive Antenna System Gain | TRA | Known |
| Terminal Receive Signal Level | TRSL | Measured |
| Terminal Power Output | TPO | Calculated |
| Terminal Transmit Antenna System Gain | TTA | Known |
| Terminal to Base Path Loss | TBPL | Unknown |
| Base Receive Antenna System Gain | BRA | Known |
| Base Receive Signal Level | BRSL | Desired |

Referring first to FIG. 4a, a signal is transmitted from the base unit 102 at a given power level. This power level is referred to as the base power output (BPO). The BPO is a known quantity provided by base unit 102. The BPO is a measure of the output power for a single subchannel. In the preferred embodiment, this value may range between about +20 dBm and about +46 dBm.

The signal is transmitted from the base unit 102 via an antenna 112. The antenna 112 has an associated gain noted as the BTA (Base Transmit Antenna system gain). The BTA encompasses not only the antenna gain but also other factors such as losses in coaxial cables between antenna 112 and unit 102. This is also a quantity that can be communicated to the terminal unit 106.

From the antenna 112, the signal will propagate to the terminal unit antenna 114. While traveling through the air, the signal will experience a loss referred to as the Base-to-Terminal Path Loss (BTPL). The BTPL is an unknown quantity that will vary depending upon factors such as the path length, weather conditions and obstacles between the transmit and receive antennas 112 and 114. Since the terminal unit may be mobile and other conditions may change, the BTPL may also vary over time.

The signal will finally be received at the terminal unit, passing through antenna 114. Terminal unit antenna 114 will contribute a gain (or loss) noted by the Terminal Receive Antenna system gain (TRA). The level of the signal received at the terminal unit 114 is referred to as the Terminal Received Signal Level (TRSL). This quantity can be measured by terminal unit 106.

Considering the signal levels and gains (or losses) illustrated in FIG. 4a, a base-to-terminal link equation can be formulated as follows.

$$TRSL = BPO + BTA - BTPL + TRA \quad (1)$$

A similar analysis can be performed for a signal traveling from the terminal unit 106 to the base unit 102 as shown in FIG. 4b. In this case, a signal output from the terminal unit 106 will have a Terminal Power Output (TPO) as set by the terminal unit 106. The terminal unit antenna 114 will contribute a known Terminal Transmit Antenna system gain (or loss) TTA. The signal will then experience an unknown Terminal-to-Base Path Loss TBPL as it propagates from terminal unit 106 to base unit 102. After the base unit antenna 112 contributes a known Base Receive Antenna system gain BRA, the signal is received at the base unit with a Base Receive Signal Level (BRSL). In the preferred embodiment of the invention, the desired BRSL is typically between about −115 dBm and −80 dBm, preferably about −95 dBm.

As before, a path link equation can be determined.

$$BRSL = TPO + TTA - TBPL + BRA \quad (2)$$

The goal here is to set the signal level received at the base unit 102 (BRSL) to a predetermined level. The lone variable that can be controlled is the level of power output from the terminal 106, i.e., the TPO.

Reviewing the path link equations (1) and (2), it can be seen that the two equations have three unknowns, namely BTPL, TBPL and TPO. To solve these equations, an assumption is therefore made that the path loss from the base unit 102 to the terminal unit 106 is the same as the path loss in the return path, i.e., from the terminal unit 106 to the base unit 102. This assumption is generally fairly accurate and leads to a third equation.

$$BTPL = TBPL \quad (3)$$

Now, having three equations with three unknowns, the terminal power output (TPO) can be calculated through straightforward algebra. In particular, the terminal power output can be calculated as $$TPO = BRSL - TTA + BPO + BTA + TRA - TRSL - BRA \quad (4)$$

It is noted that each of the components in the sum are known, the antenna system gains TTA, BTA, TRA and BRA because they are fixed quantities for a given system, the base power output BPO because it is set by the base unit, the terminal receive signal level TRSL because it is measured by the terminal, and the base receive signal level BRSL because it has been preselected.

To simplify equation (4), some of the components can be combined and renamed as follows.

$$\text{Terminal System Gain} = TSG = TRA - TTA \quad (5)$$

$$\text{Base System Gain} = BSG = BRSL + BPO + BTA - BRA \quad (6)$$

This leads to a simplified version of the equation for Terminal Power Output.

$$TPO = \text{Base System Gain} + \text{Terminal System Gain} - TRSL \quad (7)$$

The Terminal System Gain is generally about zero. Even if it is not, the value will be known to terminal unit 106. The Base System Gain is a measure of the conversion gain of the base station and will vary with different base stations. It may also vary for a given base station, for example if the output power level changes or if the base station can select between multiple antennas to transmit with. This quantity will be provided to the terminal unit by the base system and can vary with different base units.

As can be seen from Equation (7), the terminal unit 106 uses two factors (when TSG is zero) to determine the power level it transmits at initially, namely the base system gain and the signal level it receives. The base system gain is sent to the terminal. This value can be changed from time to time, for example when the base unit uses a different power output or decides that a different receive signal level is desirable. The value may also change as the terminal unit roams and changes the base unit with which it communicates. The base system gain will generally be sent periodically. To save bandwidth, the BSG does not need to be sent every slot since it does not change that often.

In this technique, the terminal receives information from the base unit in two ways. First, it measures the level of the received signal. This can be performed using well known techniques. Second, it demodulates and decodes the received signal to extract information (e.g., the base system gain) being communicated from the base unit.

The open loop power control can be understood further by use of a numerical example as listed in Table 2. The numbers provided by this table are selected as exemplary values but it is understood that these values will vary based on system design and operating conditions.

TABLE 2

| Parameter | | Value | Where from |
|---|---|---|---|
| Base Receive Signal Level | BRSL | −98 dBm | set by the system requirements |
| Base Power Output | BPO | +43 dBm | set by base unit |
| Base Transmit Antenna System Gain | BTA | +3 dB | known |
| Base Receive Antenna System Gain | BRA | +6 dB | known |
| Terminal Receive Antenna System Gain | TRA | +1 dB | known |
| Terminal Transmit Antenna System Gain | TTA | +1 dB | known |
| Terminal Receive Signal Level | TRSL | −95 dBm | measured at terminal |
| Base System Gain | BSG | −58 dB | calculate as BRSL + BPO + BTA − BRA |
| Terminal System Gain | TSG | 0 | calculate as TRA − TTA |
| Terminal Power Output | TPO | +37 dBm | calculate as BSG + TSG − TRSL |

Implementation of the above equation (7) provides open loop power control. This formula was based on an assumption that the two path losses are the same. As long as this assumption remains valid, the terminal can easily calculate its output power level and the proper level signal will be received at the base station. There are times, however, when this assumption is not necessarily valid. In those cases, closed loop power control can be used.

Open loop power control provides an initial power output level for the terminal unit 106. A terminal unit that has not communicated with the base station for a long period of time will calculate a TPO and send a message to the base station to request a channel. The base station will measure the signal level received from the terminal and compare it to the preselected target level. If the measured received signal level is different than the target level, e.g., because the path losses are different, the base unit will send a correction factor. The base unit will continue adjusting the terminal's signal level as necessary for each communication.

In the preferred system, three bits are used to adjust the signal level. These three power control incremented bits are provided during each slot and are used by the base unit to transmit output gain feedback to the terminal units. The base unit monitors the received signal strength of the terminal units and sends a power control increment instruction back to either increase output power gain, decrease output gain, or leave the gain level unchanged. In a preferred embodiment, three power control bits are decoded as indicated in Table 3. Other numbers of bits and other increment values could alternatively be used.

TABLE 3

| | |
|---|---|
| 010 | +6 dB |
| 000 | +4 dB |
| 011 | +2 dB |
| 110 | 0 (no change) |
| 001 | −2 dB |
| 100 | −4 dB |
| 111 | −6 dB |
| 101 | −8 dB |

In the preferred embodiment, both open loop and closed loop control are used simultaneously. In other words, the terminal unit will adjust its transmit power output continuously based on the received signal level and the increment/decrement messages received from the base unit. There is an advantage to continuously monitor the received signal level in that the system can get faster response by supplementing the increment/decrement messages.

In an alternate embodiment, the terminal unit may determine its initial value with open loop control and then adjust the power output solely on the basis of closed loop control. This method can have a disadvantage for mobile units. For example, if an obstruction is removed from between the terminal unit and the base unit, the proper terminal output power may vary significantly in a short period of time. Using only increment and decrement signals, it could take a number of time slots until the proper signal level is restored. When the received power is monitored, however, the terminal will detect that the path loss has changed significantly and adjust its power accordingly. This adjustment can lead to faster response time.

Figure 5:
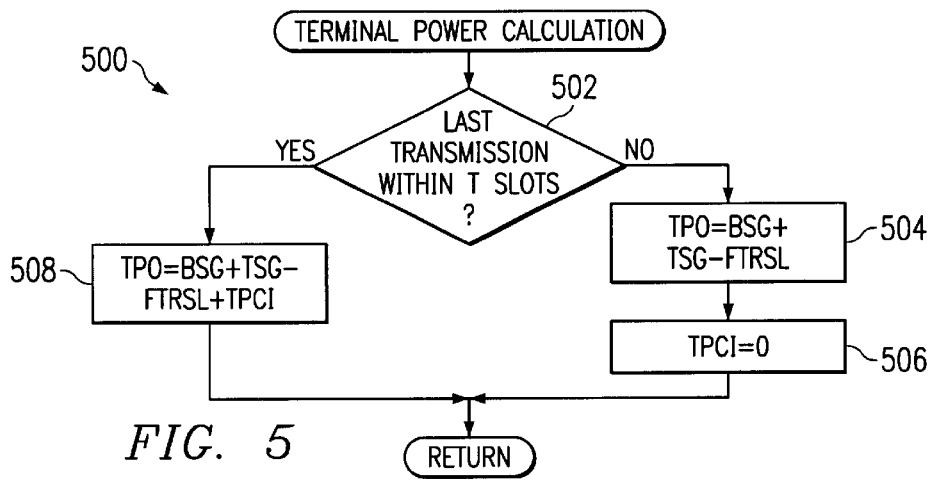
FIG. 5 is a flow chart of an algorithm that can be used to control the power of a communication unit.

FIG. 5 illustrates a flow chart 500 showing the control algorithm of the preferred embodiment. In this algorithm, the system maintains some historical signal level information. This information is combined, using given weighting factors, with the newly measured received signal level to determine the transmit level. If the received information changes by a large amount then the transmit level will also change by a relatively large amount.

In first step 502, the system determines how much time has passed since the last transmission. If the terminal unit has not communicated with the base unit in a long time, then all prior power control increment commands will be ignored. For example, the terminal unit may determine if a transmission has occurred within the last 1000 time slots (T=1000). If each time slot is 30 ms, this would equate to 30 seconds. The optimum value of T can be determined by field testing.

If the terminal has not communicated with the base station within T slots, the terminal power output TPO will be calculated using the open loop formula. This step is indicated by step 504 where BSG is the base system gain (received from the base station), TSG is the terminal system gain (known at the terminal unit), and FTRSL is the filtered terminal receive signal level (measured by the terminal unit). Since the terminal is generally on at all times, it constantly receives transmissions from the base station. Each (or some portion) of these transmissions can be measured and used as the FTRSL for step 504. The terminal power control increment TPCI will also be initialized to zero in step 506.

During the next power calculation, the algorithm will move to step 508, assuming too much time has not passed. At this point, the terminal power output TPO will be calculated using a filtered terminal receive signal level (FTRSL) that is the weighted average of the current measured received signal level and the historical signal level. In particular, the filtered terminal receive signal level can be calculated as $$FTRSL(k)=A*TRSL(k)+B*FTRSL(k-1) \qquad (8)$$

where k is the current time slot, k−1 is the previous time slot, and A and B are weighting factors (A+B=1). As an example, the weighting factors may be set as A=0.1 and B=0.9 so that the TPO formula uses a received signal level that is heavily weighted by the historical value. Empirical testing can be used to determine the optimum weighting factors A and B. TRSL(k) is the measured terminal receive signal level for the current time slot.

The terminal power output TPO is also based on the terminal power control increment TPCI, which provides the closed loop control. This factor is cumulative so that past increment and decrement signals from the base station are included. Using the increment signals in Table 2 as an example, the base station can tell the terminal to increment by 10 dB by having it increment by 6 dB in the first time slot and 4 dB in the next time slot. The terminal power control increment can be written as a formula where $$TPCI(k)=PCI(k)+TPCI(k-1)$$

where PCI(k) is the power control increment value sent by the base station at time k and TPCI(k) and TPCI(k−1) are the cumulative power control increment values at the current time slot and the previous time slot, respectively.

As in the open loop equation, BSG is the base system gain and TSG is the terminal system gain.

As discussed above, an alternate embodiment utilizes open loop control during the initialization process only. An algorithm of this embodiment could be illustrated by a flowchart that is the same as FIG. 5 except that the FTRSL term of the TPO calculation in step 508 is fixed by the initial calculation, e.g., in step 504. In this embodiment, the system could initially fix BSG, FTRSL or both the first time through and then make all adjustments based on TCPI. In this case, steps 504 and 506 provide the open loop control and step 508 provides the closed loop control.

In yet another embodiment, as noted above, the terminal may use only open loop control. In that case, the algorithm would repeat step 504 each time slot that power adjustment is activated. This last method is not generally preferred, however, since the terminal unit would have difficulty compensating if the signal level received back at the base station is too low. This problem could be overcome if the base station lowers its output power level upon detecting a low power level from the terminal. This adjustment would lead to a lower level received signal at the terminal unit, which would adjust by raising the power level.

In an alternate embodiment, the system can compensate for the situation when the terminal cannot increase its transmission gain. If this is the case, the base station can instruct terminals operating at each of the other sub-channels to lower their output power so that the signal level received at the base station will be about equal for each sub-channel. Referring to FIG. 3 as an example, the base station would instruct the terminals operating at sub-channels A, B and D to lower their output power. In this manner, each of the sub-channels A, B, C and D would be closer to the same level.

A potential problem with this embodiment is that the system determines the optimal received power based on a tradeoff between receiving a high signal level at the base unit (to maximize signal-to-noise ratio and therefore minimize bit error rate) and transmitting at a lower power level from the terminal (to save battery life). Lowering the signal for the sub-channels, may increase the bit error rate for all of the sub-channels. Therefore, a tradeoff must be made between lowering the SNR for all sub-channels and accepting energy spillover in the sub-channel that has the low signal level.

There are a number of ways to implement this alternate embodiment. For instance, the terminal unit can transmit a message to the base unit indicating its power level. As an example, a two bit message could be interpreted as: 00-transmitting at minimum power, 01-transmitting at less than 50% power, 10-transmitting at greater than 50% power, and 11-transmitting at maximum power. Alternatively, or in addition, the base unit can monitor the power received from the terminal. If the received signal level remains low after sending a number of instructions increase the terminal output power, the base may assume that the terminal power is already at maximum.

The concepts behind the alternate embodiment could also be implemented in the other direction. If the base unit observes that all of the terminals are transmitting below their maximum power level, the base unit might decide to increase the power level on all of the terminals to reduce received errors. This embodiment may be useful, for example, when the base unit determines that an error rate associated with the transmissions for the terminals is too high. This error rate might be an average error rate for all of the terminals or an error rate for just one (or some) of the terminals.

Figure 6:
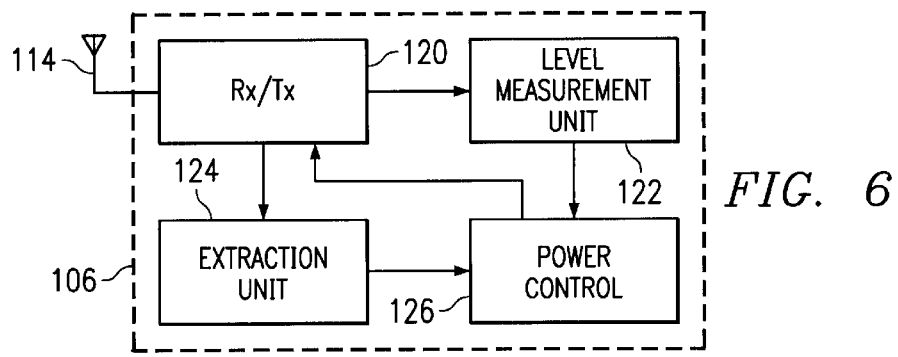
FIG. 6 is a block diagram of a terminal unit.

A simplified block diagram of a terminal unit 106 is illustrated in FIG. 6. A receiver/transmitter 120 is coupled to terminal antenna 114. Accordingly, an incoming signal will be received at receiver/transmitter 120. Receiver/transmitter may include a number of components such as frequency shifters, A/D and D/A converters, modulators and demodulators, filters and others. Specific details of a preferred receiver/transmitter 120 are provided in U.S. Pat. No. 6,252,910 (COM-002).

The incoming signal will be provided to a level measurement unit 122. The level measurement unit 122 will receive this analog signal and measure the amplitude, that is the signal level. In the preferred embodiment, this task is accomplished by a digital signal processor that computes I2 and Q2 (in-phase component and quadrature-phase component) for a number of samples for each signal. For example, each symbol period can be sampled eight times within the period. If 120 symbols are transmitted in each time slot, then the signal level would be derived from 960 samples in each time slot.

The incoming signal is also provided to an extraction unit 124. The purpose of the extraction unit is to extract digital information from the incoming signal. This digital information can include the base system gain BSG and/or the power control increment message, both of which were discussed above. The extraction unit 124 de-interleaves the control bits from the total bit stream so that the control bits can be interpreted. Once again, details on extracting information from an incoming signal are provided in the co-pending application.

Both the level measurement unit 122 and the extraction unit 124 provide information to a power control unit 126. In the preferred embodiment, this information is provided in the form of digital signals. The power control unit 126 takes the incoming information and calculates the transmit power output TPO. For example, the power control unit 126 may comprise a processor, e.g., a microprocessor and/or a digital signal processor, that executes an algorithm as detailed in FIG. 5.

The power control unit 126 includes an output coupled to receiver/transmitter 120. Output power information, e.g., the transmit power output TPO, can be provided to the receiver/transmitter along this line. As an example, the terminal power can be controlled digitally. In this case, a digital word instructs the terminal to produce one of a number of different power levels. For example, if there are 30 different power levels that are each 2 dB apart, the terminal would have a 60 dB range. This task could also be accomplished using an analog signal or with a different number of steps or step differences. As described above, the output power information will based on the information received from the extraction unit 124 and the level measurement unit 122.

Throughout the detailed description as provided above, reference is made to the signal level, for example the base receive signal level (BRSL) or the transmit receive signal level (TRSL). As discussed above, this level can be measured in terms of absolute signal level, e.g., a voltage received at the appropriate location. Alternatively, the signal-to-noise ratio can be used in place of the signal level. It is intended that all references to signal level, including in the claims, include both absolute signal level and signal-to-noise ratio.

In fact, using the signal-to-noise ratio provides some advantage in that this is the value that truly affects system performance. Even if the absolute signal level is low, the system performance will not be degraded if the signal-to-noise ratio is high enough.

Signal-to-noise ratio can be measured in a number of ways such as by approximation from the bit error rate. For example, the system could monitor the cyclic redundancy code (CRC) and estimate signal-to-noise ratio from the number of errors detected. Alternatively, or in addition, convolutional encoding and Viterbi decoding can be used to estimate the error rate. With this technique, the signal is convolutionally encoded at the transmitter and sent to the receiver. At the receiver, the signal is decoded and then re-encoded. The error rate can then be estimated by comparing the re-encoded data with the received data.

While being described so far in terms of a radio frequency system, the present invention also applies to a number of different applications. For example, the present invention could be applied to cable modems, two way fiber optic links, and point-to-multipoint microwave systems.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of communicating from a terminal unit to a base unit, the method comprising:

receiving an incoming signal at the terminal unit, the signal being from the base unit;

measuring the signal level of the incoming signal;

determining an output power level based on an extracted base system gain message, wherein the output power level is further determined by both the measured incoming signal level and a historical incoming signal level, the historical incoming signal level being determined by maintaining information regarding measured incoming signal levels from prior incoming signals, wherein the output power level is subsequently further determined by adding about ten percent of the measured incoming signal level and about ninety percent of the historical incoming signal level; and transmitting an outgoing signal from the terminal unit, the outgoing signal being transmitted at the output power level subsequently determined.

2. The method of claim 1, and further comprising extracting a base system gain message from the incoming signal, wherein the output power level is determined based on the extracted base system gain message.

* * * * *